United States Patent [19]

Obara

[11] 4,387,285
[45] Jun. 7, 1983

[54] POWER SOURCE FOR WIRE-CUT ELECTRIC DISCHARGE MACHINES

[75] Inventor: Haruki Obara, Sagamihara, Japan

[73] Assignee: Fujitsu Fanuc Limited, Tokyo, Japan

[21] Appl. No.: 217,804

[22] Filed: Dec. 18, 1980

[30] Foreign Application Priority Data

Dec. 22, 1979 [JP] Japan .................................. 54-167924

[51] Int. Cl.³ .............................................. B23P 1/08
[52] U.S. Cl. ................................ 219/69 P; 219/69 C; 219/69 W
[58] Field of Search .................. 219/69 P, 69 C, 69 W

[56] References Cited

U.S. PATENT DOCUMENTS

| 3,246,113 | 4/1966 | Scarpelli | 219/69 C |
| 3,627,966 | 12/1971 | Osenbruggen et al. | 219/69 C |
| 3,757,073 | 9/1973 | Osenbruggen et al. | 219/69 C |
| 4,310,741 | 1/1982 | Inoue | 219/69 C |

Primary Examiner—C. C. Shaw
Attorney, Agent, or Firm—Staas & Halsey

[57] ABSTRACT

A power source for wire-cut electric discharge machines which is designed to increase the cutting speed and improve the surface roughness of a workpiece. A capacitor for supplying a discharge energy across a wire electrode and the workpiece is always by a DC power supply and the charged voltage across the capacitor is applied across the machining gap via a switching element. The switching element is turned ON when the voltage across the capacitor reaches a predetermined level, and turned OFF when the voltage becomes substantially zero, permitting rapid charging of the capacitor and the generation of a uniform discharge energy.

2 Claims, 5 Drawing Figures

COMPLETION OF
DISCHARGE

POWER SOURCE FOR WIRE-CUT ELECTRIC DISCHARGE MACHINES

BACKGROUND OF THE INVENTION

1. Field of the Invention

The present invention relates to a power source for producing a discharge between a wire electrode and a workpiece in wire-cut electric discharge machines.

2. Description of the Prior Art

An example of a known power source of this kind is, shown in FIG. 1. In FIG. 1, reference character WR indicates a wire electrode; WK designates a workpiece; Vs identifies a DC power supply; C denotes a capacitor; R represents a charging resistor; and Q shows a switching element such as a transistor or the like. By repeating the ON-OFF operation of the switching element Q, the capacitor C is charged by the DC power supply Vs via the charging resistor R. The charged voltage is applied across the wire electrode WR and the workpiece WK and a discharge current from the capacitor C flows in a discharge gap defined between the wire electrode WR and the workpiece WK, performing electric discharge machining of the latter.

For a stable discharge in electric discharge machining, a certain discharge suspension period is required for each discharge and, at the same time, care should also be taken while applying voltage during the period immediately following each discharge. The insulation recovery characteristic of the discharge gap after a discharge is schematically indicated by the solid line A in FIG. 2. When a voltage higher than the curve A (which voltage will hereinafter be referred to as the redischarge voltage) is applied across the discharge gap, it is likely that a discharge will be repeated at the same position or that an arc discharge will result.

With the view of settling this problem, in the prior art circuit of FIG. 1 the charging time constant of the capacitor C is selected to be large so that its charging characteristic curve may exceed the insulation recovery characteristic curve A, that is, the redischarge voltage, as indicated by the broken line B in FIG. 2. Accordingly, the frequency of discharge per unit time is limited and the cutting speed cannot be raised. Furthermore, the conventional circuit is a dependent discharge circuit, which may sometimes be discharged before the capacitor C is sufficiently charged and consequently the discharge energy may vary for each discharge, resulting in unsatisfactory surface roughness of the workpiece.

SUMMARY OF THE INVENTION

It is an object of the present invention to provide a power source suitable for use in wire-cut electric discharge machines.

Another object of the present invention is to provide a power source for wire-cut electric discharge machines which permits an increase in the frequency of discharge per unit time in the working gap, thereby raising the cutting speed.

Yet another object of the present invention is to provide a power source for wire-cut electric discharge machines which ensures a uniform discharge energy for each discharge in the working gap, thereby improving the surface roughness of the workpiece.

Briefly stated, the power source of the present invention for use in wire-cut electric discharge machines is provided with a capacitor which is charged by a power supply for supplying a discharge energy between a wire electrode and a workpiece, a switching element inserted in the discharge path of the capacitor and control means for turning the switching element on when the voltage across the capacitor reaches a predetermined level and turning the switching element off upon completion of the discharge. The charging time constant of the capacitor is selected to be small to such an extent that the charging voltage of the capacitor exceeds the redischarge voltage in the working gap between the wire electrode and the workpiece at an early stage of the charging of the capacitor. The switching element is turned ON at the moment when the charged voltage of the capacitor becomes small relative to the redischarge voltage as a result of its abrupt increase.

DESCRIPTION OF THE PREFERRED EMBODIMENTS

Figure 1:
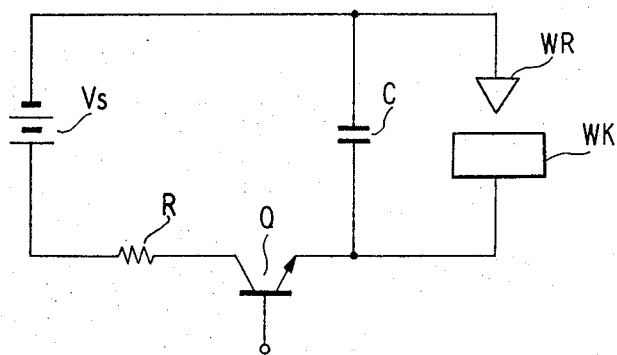
FIG. 1 is an electric circuit diagram showing a conventional wire-cut electric discharge machine power source.
Figure 2:
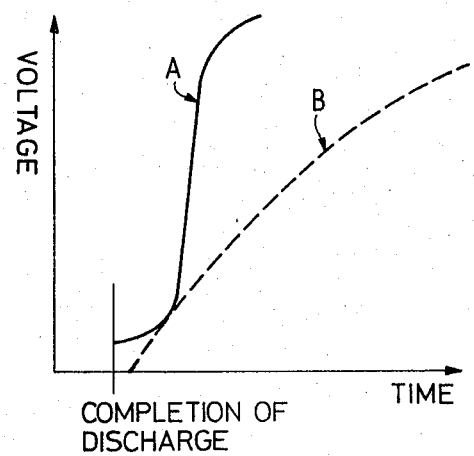
FIG. 2 is a graph showing the relationship between the insulation recovery characteristic of a discharge gap and the charging characteristic of a capacitor.
Figure 3:
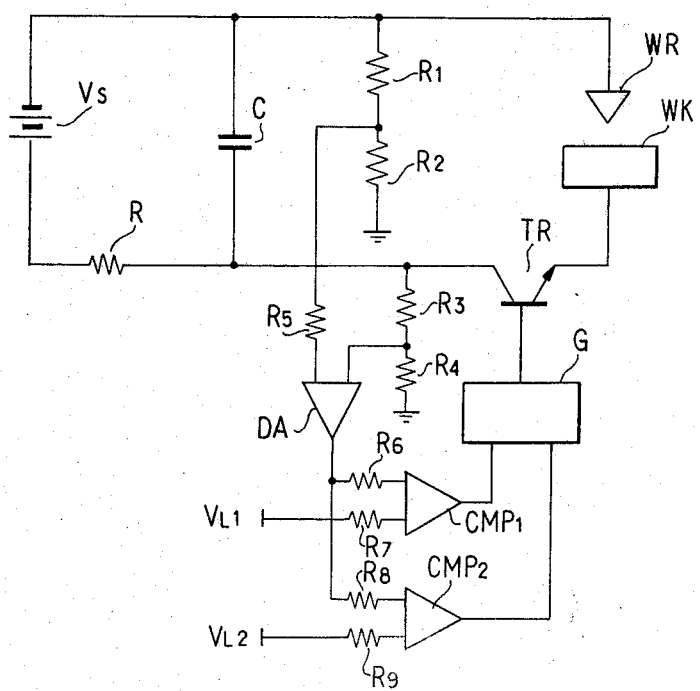
FIG. 3 is a block diagram illustrating the principal part of an embodiment of the wire-cut electric discharge machine power source of the present invention.

FIG. 3 illustrates in block form the principal part of an embodiment of the present invention, in which the parts corresponding to those in FIG. 1 are identified by the same reference characters. In FIG. 3, reference character TR indicates a transistor or like switching element; $R_1$ to $R_9$ designate resistors; DA identifies a differential amplifier; $CMP_1$ and $CMP_2$ denote comparators; $V_{L1}$ and $V_{L2}$ represent reference voltages; and G shows a gate circuit.

Unlike the circuit of FIG. 1, the present embodiment is arranged so that the capacitor C may always be charged by the DC power supply Vs via the charging resistor R and so that charges stored in the capacitor C are applied across the wire electrode WR and the workpiece WK via the switching element TR inserted in the discharge path of the capacitor C. The voltage across the capacitor C is detected by the resistors $R_1$ to $R_5$ and the differential amplifier DA and provided to one input terminal of the comparator $CMP_1$ via the resistor $R_6$ and to one input terminal of the comparator $CMP_2$ via the resistor $R_8$. The comparator $CMP_1$ makes a comparison between the output from the differential amplifier DA and the reference voltage $V_{L1}$ applied to the other input terminal, thereby detecting whether to detect that the charged voltage of the capacitor C has reached a predetermined level suitable for discharging. The comparator $CMP_2$ compares the output from the differential amplifier DA with the reference voltage $V_{L2}$ applied to the other input terminal, thereby detecting whether the voltage across the capacitor C has been reduced to a suitably low level. The gate circuit G performs logical processing of the outputs from the comparators CMP$_1$ and CMP$_2$ to achieve ON-OFF control of the switching element TR.

Figure 4:
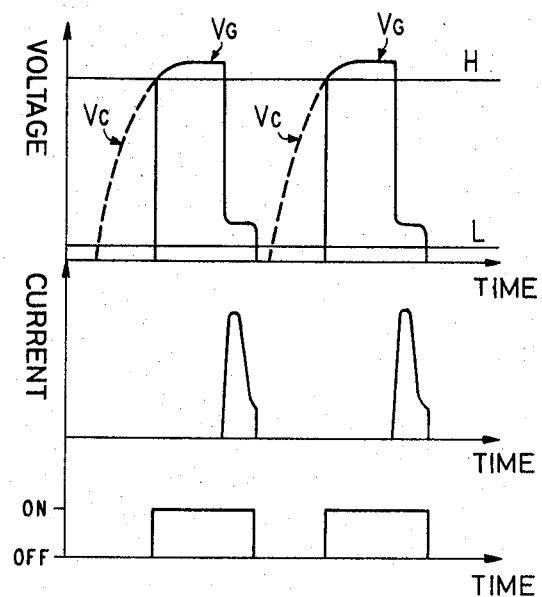
FIG. 4 is a graph showing variations in voltage $V_C$ across a capacitor C, a gap voltage $V_G$, a discharge current I and the operation of a switching element TR with time when the power source of FIG. 3 is operated.

FIG. 4 shows variations in the voltage V$_C$ across the capacitor C, the gap voltage V$_G$, the discharge current I and the operation of the switching element TR with time when the device of FIG. 3 was operated. A description will be given, with reference to FIG. 4, of the operation of the embodiment of FIG. 3.

When the capacitor C is charged by the DC power supply Vs with the characteristic indicated by the curve V$_C$ in FIG. 4 and its potential reaches a predetermined level H suitable for discharging, this is detected by the comparator CMP$_1$ and the gate circuit G turns the switching element TR ON. As a consequence, the voltage V$_C$ across the capacitor C is applied as the gap voltage V$_G$ the wire electrode WR and the workpiece WK and, after a very short period of time, the discharge current I flows in the discharge gap to effect electric discharge machining of the workpiece WK. When the discharge is started, the voltage across the capacitor C rapidly drops and the comparator CMP$_2$ detects when the voltage becomes lower than the predetermined level L. The gate circuit G detects the completion of the discharge from the output from the comparator CMP$_2$ and quickly turns the switching element TR OFF and, by this operation, the capacitor C is charged again to be ready for the next discharge.

Figure 5:
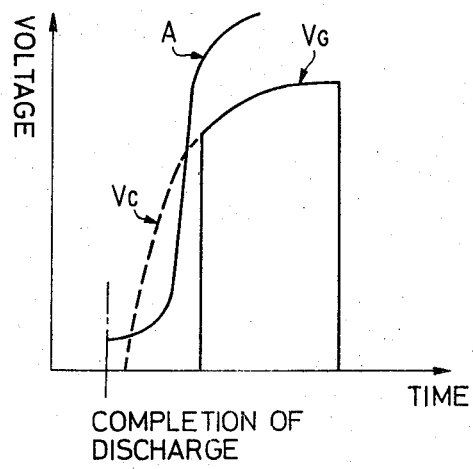
FIG. 5 is a graph showing the relationship between the insulation recovery characteristic of the discharge gap and the gap voltage $V_G$.

FIG. 5 is a graph showing the relationship between the insulation recovery characteristic of the discharge gap and the gap voltage V$_G$. It appears from FIG. 5 that even if the capacitor C is charged so rapidly that the voltage across capacitor L exceeds the redischarge voltage A as indicated by the curve V$_C$, the voltage is not provided across the discharge gap because the switching element TR is in the OFF state in the region above the redischarge voltage FIG. 5 also shows that the voltage is applied across the discharge gap immediately after the voltage V$_C$ across the capacitor C becomes lower than the redischarge voltage A. Since the redischarge voltage across the discharge gap undergoes various changes during machining, the arrangement described previously is not quite free from abnormal discharge. By a suitable selection of the level H in FIG. 4 and the charging time constant of the capacitor C in view of an average redischarge voltage characteristic, however, sufficiently stable discharging is possible and, in addition, the frequency of discharging can markedly be increased. Moreover, since the discharge is started when the charged voltage V$_C$ of the capacitor C reaches a predetermined level, the energy for each discharge is uniform.

As will be appreciated from the foregoing description, according to the present invention, since no voltage is applied across the discharge gap until the switching element is turned ON, even if the capacitor is rapidly charged, abnormal discharges do not as in the prior art; accordingly, the frequency of discharging can be raised, permitting an increase in the cutting speed. Furthermore, since the energy for each discharge is made uniform, a worked surface of good quality can be obtained.

It will be apparent that many modifications and variations may be effected without departing from the scope of the novel concepts of the present invention.

What is claimed is:

1. A power source for a wire-cut electric discharge machine for machining a workpiece using a wire electrode separated from the workpiece by a gap, comprising:

a capacitor;

means for continuously charging the capacitor to supply energy for discharge across the gap;

a switching element inserted between the capacitor and the gap; and control means for producing a single arc discharge across the gap every time the capacitor is charged to a first predetermined level, by turning the switching element ON to initiate the discharge when the voltage across the capacitor reaches the first predetermined level and by turning the switching element OFF to terminate the discharge when the voltage across the capacitor falls to a second predetermined level that is lower in magnitude than the first predetermined level but that has the same polarity, wherein said control means includes differential amplifier means for detecting the voltage across the capacitor, first comparator means for comparing the output from the differential amplifier means and the first reference voltage to detect when the voltage across the capacitor reaches the first predetermined level, second comparator means for comparing the output from the differential amplifier means and the second reference voltage to detect when the voltage across the capacitor has reached the second predetermined level, and gate circuit means, which is supplied with the outputs from the first and second comparator means, for generating a drive signal for the switching element.

2. A power source according to claim 1 wherein the charging time constant of the capacitor is selected to be small to such an extent that the voltage across the capacitor exceeds the redischarge voltage across the gap before the voltage across the capacitor reaches the first predetermined level, and wherein the control means turns the switching element ON after the voltage across the capacitor exceeds the redischarge voltage.

* * * * *

UNITED STATES PATENT AND TRADEMARK OFFICE
CERTIFICATE OF CORRECTION

PATENT NO. : 4,387,285
DATED : June 7, 1983
INVENTOR(S) : Obara

It is certified that error appears in the above-identified patent and that said Letters Patent is hereby corrected as shown below:

Front page, [56] References Cited, "Ossenbruggen et al." (both occurrences) should be --van Ossenbruggen et al.--;

Item, [57] Abstract, line 5, after "always" insert --charged--;
line 6, delete "charged".

Col. 1, line 11, after "is" delete ",".

Signed and Sealed this

First Day of November 1983

[SEAL]

Attest:

GERALD J. MOSSINGHOFF

Attesting Officer

Commissioner of Patents and Trademarks